(12) United States Patent
Takase et al.

(10) Patent No.: US 7,747,156 B2
(45) Date of Patent: Jun. 29, 2010

(54) DIGITAL SINGLE-LENS REFLEX CAMERA

(75) Inventors: Masami Takase, Hino (JP); Fujio Kosaka, Hino (JP)

(73) Assignee: Olympus Imaging Corp., Tokyo (JP)

( * ) Notice: Subject to any disclaimer, the term of this patent is extended or adjusted under 35 U.S.C. 154(b) by 1016 days.

(21) Appl. No.: 11/487,805

(22) Filed: Jul. 17, 2006

(65) Prior Publication Data

US 2007/0019939 A1 Jan. 25, 2007

(30) Foreign Application Priority Data

Jul. 21, 2005 (JP) .............................. 2005-211431

(51) Int. Cl.
*G02B 7/28* (2006.01)
*G03B 13/06* (2006.01)

(52) U.S. Cl. ...................... 396/111; 396/152
(58) Field of Classification Search .................. 396/84, 396/111, 148, 150, 151, 152
See application file for complete search history.

(56) References Cited

U.S. PATENT DOCUMENTS

| | | | | |
|---|---|---|---|---|
| 4,818,865 | A | * | 4/1989 | Matsui et al. ............. 250/201.2 |
| 5,363,163 | A | * | 11/1994 | Hayashi et al. ............. 396/379 |
| 5,585,965 | A | * | 12/1996 | Hayashi et al. ............. 359/431 |
| 6,741,284 | B1 | | 5/2004 | Shono |
| 6,961,089 | B2 | | 11/2005 | Kubo |
| 7,006,140 | B2 | | 2/2006 | Shono |
| 7,414,664 | B2 | * | 8/2008 | Suda ........................... 348/341 |
| 2004/0155976 | A1 | | 8/2004 | Suda | |

FOREIGN PATENT DOCUMENTS

| | | |
|---|---|---|
| CN | 1550864 | 12/2004 |
| JP | 08-005900 | 1/1996 |
| JP | 2004-184952 | 7/2004 |

OTHER PUBLICATIONS

Chinese Office Action for Chinese Patent Application No. 2006101077472, mailed on Jun. 6, 2008 (6 pgs.) (with English Translation (8 pgs.)).

* cited by examiner

*Primary Examiner*—Rodney E Fuller
(74) *Attorney, Agent, or Firm*—Straub & Pokotylo; John C. Pokotylo

(57) ABSTRACT

A digital single-lens reflex camera includes a first mirror for reflecting part of a light beam coming from a subject through a photographing optical system and transmitting the remaining light beam. The reflected light beam is used for detecting the focus state of an imaging light beam, and the transmitted light beam is used for performing live view display. For example, the first mirror can be configured as a movable mirror in the digital single-lens reflex camera. This enables continuous live view display using the transmitted light beam on condition that the movable mirror is down while detecting the focus state using the reflected light beam. In addition, phase-contrast AF can be adopted for detecting the focus state.

8 Claims, 6 Drawing Sheets

DIGITAL SINGLE-LENS REFLEX CAMERA

CROSS-REFERENCE TO RELATED APPLICATION

This application is based upon and claims the benefit of priority from prior Japanese Patent Application No, 2005-211431, filed Jul. 21, 2005, the entire contents of which are incorporated herein by reference.

BACKGROUND OF THE INVENTION

1. Field of the Invention

The present invention relates to a digital single-lens reflex camera.

2. Description of the Related Art

As a conventional autofocus (AF) technique for digital single-lens reflex cameras, phase-difference type AF (phase-difference AF) is known (for example, see Japanese Patent Laid-Open No. 2004-184952). This phase-difference AF can figure out the defocus amount of a photographing optical system in one-time focus detection operation to enable fast AF with a short release time lag.

In general, in a phase-difference AF system, a light beam that has passed through the photographing optical system is transmitted through a movable mirror and then reflected downward by a sub-mirror arranged behind the movable mirror so that the light beam will be guided to an AF sensor through an AF optical system arranged in the reflection direction of the sub-mirror. Then defocus amount is calculated from the output of the AF sensor. In the conventional single-lens reflex camera, since an image pickup device for capturing a subject image is arranged behind the movable mirror, any light beam for forming the subject image cannot be guided to the image pickup device during the phase-difference AF operation. Thus, since the image pickup device cannot capture a series of subject images continuously during the phase-difference AF operation, the camera cannot provide continuous display of the captured images, so-called live view display, on an LCD monitor or the like.

In other words, in order to display a live view on the LCD monitor or the like, it is necessary to change the position of the movable mirror to an up position retracted from the photographing optical path so that the subject image will be guided directly to the image pickup device. On the contrary, it is necessary to keep the movable mirror at the down position during phase-difference AF, and this makes it difficult to perform phase-difference AF while displaying a live view.

Therefore, a digital still camera is proposed, which can perform contrast type AF (contrast AF) in addition to phase-contrast AF so that either of AF systems can be selected according to the circumstances (see Japanese Patent Laid-Open No. 2001-272593). The contrast AF system is to achieve AF by driving the photographing optical system in such a manner that the contrast of a subject image captured by the image pickup device will become the highest. This contrast AF makes it possible to perform AF while displaying a live view.

However, even using the technique described in Japanese Patent Laid-Open No. 2001-272593, live view display cannot be performed when phase-difference AF is selected. In other words, there is no other choice but to select contrast AF in order to perform live view display and AF simultaneously, and this makes it hard to achieve fast AF.

BRIEF SUMMARY OF THE INVENTION

The digital single-lens reflex camera of the present invention has a first mirror for reflecting part of a light beam coming from a subject through a photographing optical system and transmitting the remaining light beam. The reflected part of the light beam is used for detecting the focus state of an imaging light beam, and the transmitted part of the beam is used for performing live view display.

For example, the first mirror can be configured as a movable mirror in the digital single-lens reflex camera. This enables continuous live view display using the transmitted light beam on condition that the movable mirror is down while detecting the focus state using the reflected light beam. In addition, phase-contrast AF can be adopted for detecting the focus state.

As an exemplary structure of the present invention, there is provided a digital single-lens reflex camera comprising: a first mirror for reflecting part of a light beam coming from a subject through a photographing optical system as a first light beam, and transmitting the remaining light beam as a second light beam; a relay lens on which the first light beam is incident; a second mirror for reflecting part of the light beam passing through the relay lens as a third light beam, and transmitting the remaining light beam as a fourth light beam; a screen on which a subject image based on the third light beam is formed again; a loupe optical system for observing the subject image on the screen; an AF optical system on which the fourth light beam is incident; a focus-state detection part for detecting the focus state of the photographing optical system based on the fourth light beam passing through the AF optical system; an imaging part including an image pickup device repeatedly capturing images of the subject based on the second light beam; and a display part for performing live view display based on subject image signals output from the imaging part.

According to the present invention, even when phase-difference AF is adopted, there can be provided a digital single-lens reflex camera capable of performing both high-speed phase-difference AF and live view display.

BRIEF DESCRIPTION OF THE SEVERAL VIEWS OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENT

A preferred embodiment of the invention is described below with reference to the accompanying drawings.

Figure 1:
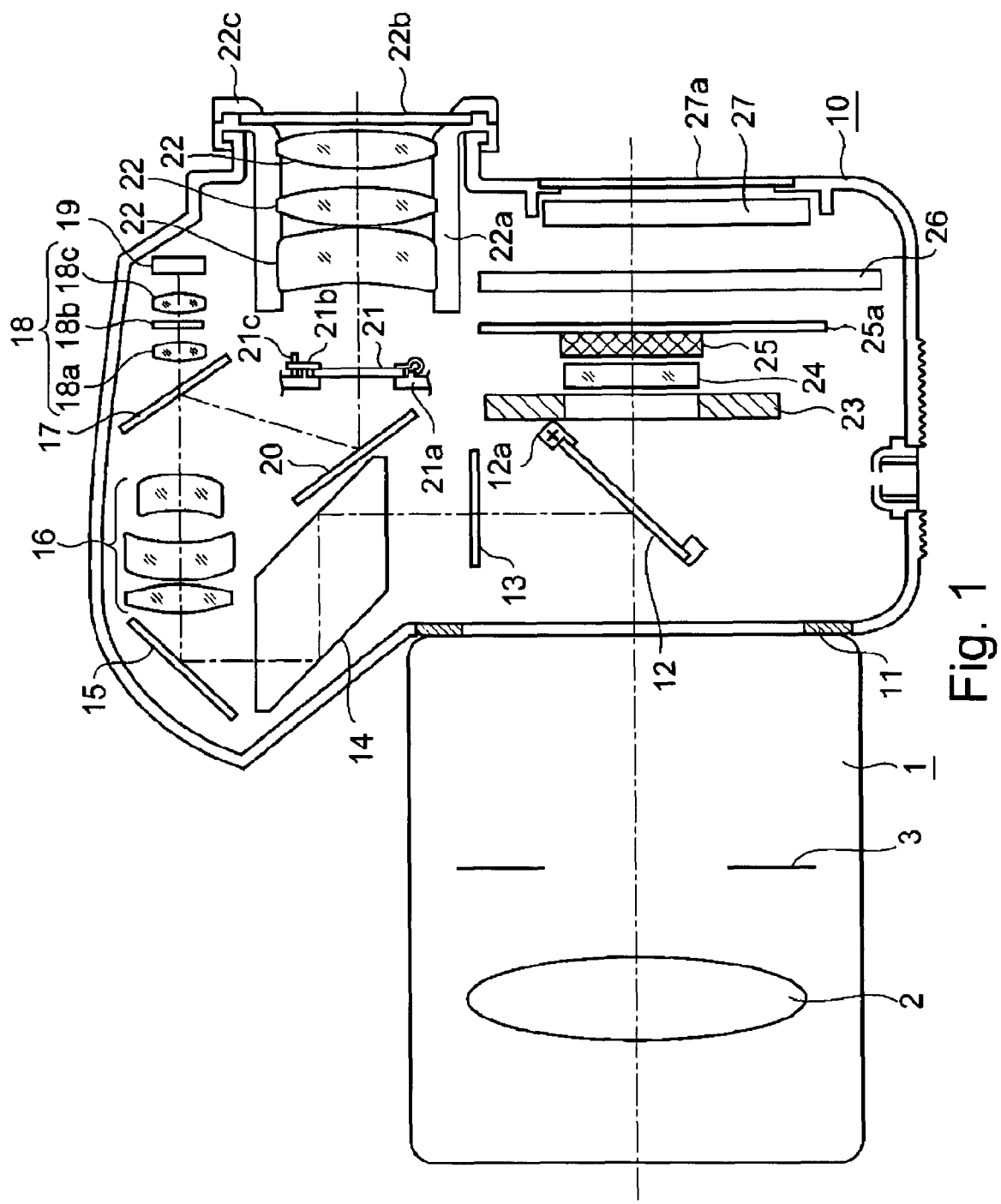
FIG. 1 is a view particularly showing the structure of an optical system inside the body of a digital single-lens reflex camera according to one preferred embodiment of the present invention.

FIG. 1 is a view particularly showing the structure of an optical system inside the body of a digital single-lens reflex camera (hereinafter simply called "camera") according to the preferred embodiment of the present invention. The camera of FIG. 1 illustrates by an example a lens interchangeable type single-lens reflex camera. In other words, the camera of FIG. 1 consists principally of an interchangeable lens 1 and a camera body 10. The interchangeable lens 1 is removably mounted on the camera body 10 with a lens mount 11 provided on the camera body 10.

In FIG. 1, a photographing optical system 2, an aperture 3, etc. are provided inside the interchangeable lens 1. The photographing optical system 2 consists of a combination of multiple lenses to guide a light beam of a subject image, not shown, into the camera body 10. The aperture 3 controls the amount of light of the subject image incident through the photographing optical system 2. The photographing optical system 2 and the aperture 3 are driven by a focus motor and an aperture motor, respectively, to be described later.

Figure 2:
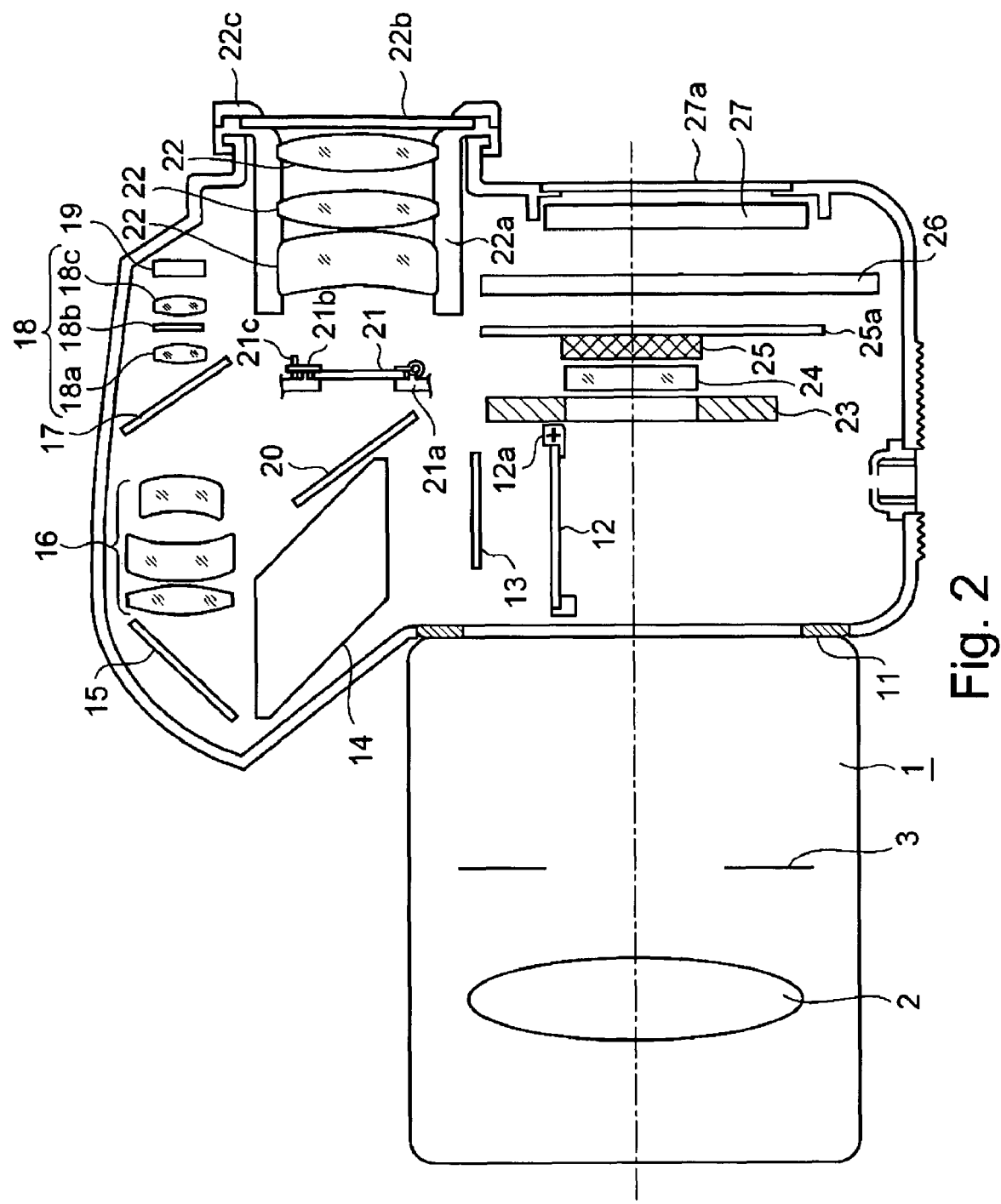
FIG. 2 is a view when a movable mirror is at an up position.

Further, in FIG. 1, a movable mirror 12 as a first mirror is provided at a position (down position) on the photographing optical axis of the photographing optical system 2 inside the camera body 10 with a predetermined angle with respect to the photographing optical axis. The movable mirror 12 is a light transmitting mirror having a function for reflecting and transmitting the light beam at a predetermined ratio (e.g., 3:7) (hereinafter called the "half mirror"). When located at the down position as in FIG. 1, the half mirror divides the light passing through the photographing optical system 2 in such a manner that one divided light beam (first light beam) is reflected in the direction of a cover glass 13 and the other divided light beam (second light beam) is transmitted in the direction of an image pickup device 25. The movable mirror 12 is provided rotatably about an axis 12a and driven by a mirror/shutter driving motor to be described later. When rotated, the movable mirror 12 changes its position to the up position retracted from the photographing optical axis as shown in FIG. 2. In this case, the light beam of the subject image that has passed through the photographing optical system 2 totally irradiates on the image pickup device 25. In the embodiment, since an AF optical system and the like are provided in a position to be described later, there is no need to provide a sub-mirror that used to be mounted integrally with the movable mirror 12.

The cover glass 13 is arranged in a position optically equivalent to the image pickup device 25, so that the light beam (first light beam) reflected by the movable mirror 12 forms a primary image of the subject. Although the cover glass 13 is provided to prevent dust from entering a relay optical system or the like to be described later, it is not necessarily provided in the embodiment. A prism 14 is provided above the cover glass 13. The prism 14 allows the light beam of the subject image formed on the cover glass 13 to enter a total reflection mirror 15 as shown in FIG. 1. The total reflection mirror 15 is provided at a predetermined angle with respect to the incident direction of the light beam from the prism 14 so that it will reflect the light beam from the prism 14 in the direction of a relay lens 16. The relay lens 16 condenses the light beam reflected through a reflection optical system consisting of the prism 14 and the total reflection mirror 15, and allows the condensed light beam to enter a second mirror 17, which is formed into a half mirror in the same manner as the movable mirror 12.

The second mirror 17 having half mirror characteristics divides the light beam that has passed through the relay lens 16 in such a manner that one divided light beam (fourth light beam) is transmitted in the direction of an AF optical system 18 and the other divided light beam (third light beam) is reflected in the direction of a total reflection mirror 20.

The AF optical system 18 includes a condenser lens 18a, a separator aperture 18b, and a separator lens 18c. The condenser lens 18a condenses the light beam (fourth light beam) that has passed through the second mirror 17 and allows the condensed light beam to enter the separator aperture 18b. The separator aperture 18b limits the amount of incident light on the separator lens 18c. The separator lens 18c uses a separator mask, not shown, to pupil-split the light beam incident on it through the separator aperture 18b so that the pupil-split light beams are to be incident on an AF sensor 19, respectively. The AF sensor 19 as a focus-state detection part includes line sensors for receiving the pupil-split light beams, respectively. In other words, the AF sensor 19 receives the pupil-split light beams and outputs signals according to the amounts of received light, respectively. The signals are converted to digital signals through an A/D converter, not shown, and output to a computation part in the camera body 10 to be described later.

The total reflection mirror 20 reflects the light beam (third light beam) reflected by the second mirror 17 in the direction of a focusing screen 21. Thus, the prism 14, the total reflection mirror 15, the relay lens 16, the second mirror 17, and the total reflection mirror 20 constitute a relay optical system. Note that the prism 14, the total reflection mirror 15, and the total reflection mirror 20 are not essential features in the embodiment, and these elements can be combined as appropriate to constitute the reflection optical system. Further, the total reflection mirrors 15, 20 can be configured as half mirrors so that part of the light beam will be guided to another optical component, respectively.

The focusing screen 21 is placed on a screen mounting 21a and retained by a screen frame 21b. The screen frame 21b is held by a screen frame holding plate 21c. In this structure, the light beam reflected by the total reflection mirror 20 is formed into a secondary image on the focusing screen 21. The focusing screen 21 has a diffusing surface for diffusing the light beam to form an optical image from the light beam reflected by the second mirror 17. The light beam of the subject image formed on the focusing screen 21 enters a loupe optical system 22. The loupe optical system 22 makes such an adjustment that the subject image re-formed on the focusing screen 21 can be observed. The loupe optical system 22 is held by an eyepiece frame 22a. An eyepiece glass 22b is provided on the eyepiece side of the loupe optical system 22 to protect the loupe optical system 22. Further, the eyepiece glass 22b is held by an eye cup 22c.

On the other hand, a focal-plane shutter 23 and an optical low-pass filter 24 are arranged in front of the image pickup device 25. The shutter 23 is capable of being opened or closed by the mirror/shutter driving motor to be described later to adjust the amount of light that has passed through the photographing optical system 2 and enters the image pickup device 25. The optical low-pass filter 24 removes unnecessary highfrequency components from the light beam that has passed through the photographing optical system 2.

The image pickup device 25 performs image pickup, that is, photoelectrically converts the incident light beam into current signals. The obtained signals are output to the computation part to be described later through an image pickup device driving circuit 42 to be described later. Note that a part including the image pickup device 25 and the image pickup device driving circuit 42 is called an imaging part below. The image pickup device 25 is held by an image pickup device receiving plate 25a. In the embodiment, the image pickup device 25 is used to capture images for live view display and image recording (still image shooting), respectively. The live view display is a technique for continuously capturing a series of subject images upon observation of a subject as mentioned above to display the captured images continuously on a display part such as a monitor to be described later. The live view display is performed when a live view mode is set as a camera mode in a manner to be described later.

A substrate 26 is a circuit board on which various electric circuits are mounted. The electric circuits include the calculation part and various motor drive circuits for processing the output of the AF sensor 19 and the image pickup device 25. A monitor 27 is, for example, an LCD monitor, for image display. The monitor 27 is protected by a monitor window 27a.

Figure 3:
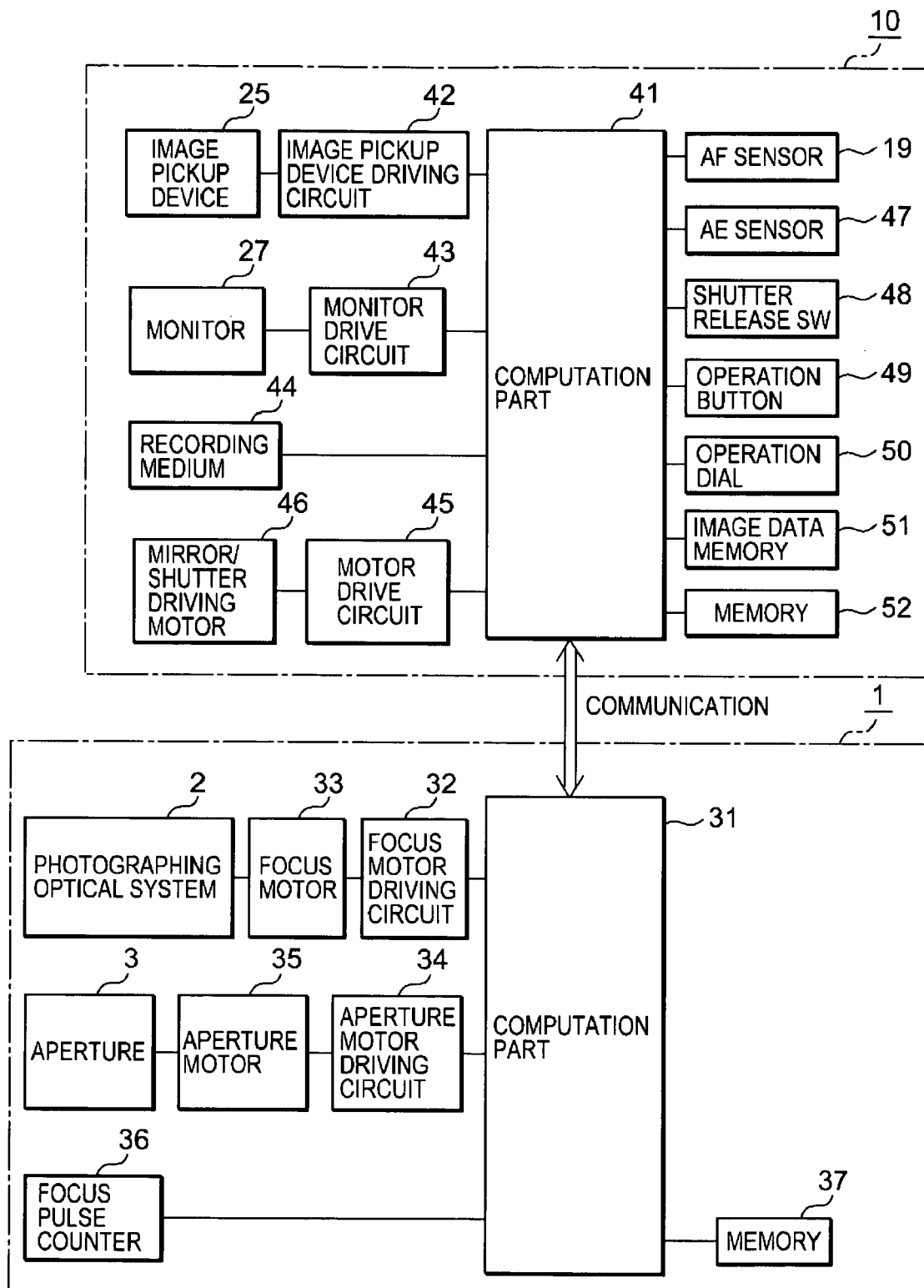
FIG. 3 is a block diagram particularly showing an electric circuit system of the camera.

FIG. 3 is a block diagram particularly showing the electric circuit system of the camera shown in FIGS. 1 and 2. Note that the portions described in FIG. 1 are given the same reference numerals and their repetitive description will be omitted.

In FIG. 3, a computation part 31 is provided inside the interchangeable lens 1. The computation part 31 is a control circuit for controlling all the operations inside the interchangeable lens 1. A focus motor driving circuit 32, an aperture motor driving circuit 34, a focus pulse counter 36, and a memory 37 are connected to the computation part 31.

The focus motor driving circuit 32 is a drive circuit for driving a focus motor 33 in accordance with an instruction from the computation part 31. The focus motor 33 is a motor for driving the photographing optical system 2. The aperture motor driving circuit 34 is a drive circuit for driving an aperture motor 35 in accordance with an instruction from the computation part 31. The aperture motor 35 is a motor for driving the aperture 3. The focus pulse counter 36 counts the current pulses for driving the focus motor 33 to detect the lens position of the photographing optical system 2, and outputs the counting result to the computation part 31. The memory 37 is a memory for storing lens information on the photographing optical system 2 such as lens aberration.

On the other hand, in FIG. 3, a computation part 41 is provided inside the camera body 10. The computation part 41 is a control circuit for controlling the entire operation of the camera, such as to control the operation of various drive circuits, live-view image processing for image signals obtained from the image pickup device, AF processing based on the output of the AF sensor, and AE processing based on the output of an AE sensor. The image pickup device driving circuit 42, a monitor drive circuit 43, a recording medium 44, a motor drive circuit 45, the AF sensor 19, an AE sensor 47, a shutter release switch part (SW) 48, an operation button part 49, an operation dial part 50, an image data memory 51, and memory 52 are connected to the computation part 41.

In addition to driving the image pickup device 25, the image pickup device driving circuit 42 reads signals obtained from a subject image captured by the image pickup device 25, performs analog processing such as correlated double sampling and gain control, and digitizes and outputs the processed signals to the computation part 41.

The monitor drive circuit 43 converts image data input from the computation part 41 into a format suitable for display on the monitor 27, and displays the image on the monitor 27. The monitor drive circuit 43 and the monitor 27 are together called a display part.

The recording medium 44 records image data compressed by the computation part 41. Examples of the recording medium 44 include a memory card and the like removably loaded into the camera body 10.

The motor drive circuit 45 is a drive circuit for driving a mirror/shutter driving motor 46. The AE sensor 47 is provided, for example, near the prism 14 to output, to the computation part 41, a signal according to the amount of light incident on the prism 14. The shutter release switch part 48 is a switch part operated with each press of a shutter button exposed to the outside of the camera body. The shutter release switch part 48 consists of two-step switches, namely a 1st shutter release switch and a 2nd shutter release switch. The operation button part 49 consists of operation buttons other than the shutter button including, for example, a setting part for setting a live view mode for displaying a live view on the monitor 27. The operation dial part 50 is a dial operation part including a mode setting dial for setting the operation mode of the camera. The image data memory 51 temporarily stores various kinds of image data, such as image data obtained from the image pickup device driving circuit 42 and image data processed by the computation part 41. The memory 52 is a memory for storing various adjusted values for the camera body 10. A functional block for enabling the above-mentioned live view display is called a live view display section, which includes the image pickup device 25, the image pickup device driving circuit 42, the monitor 27 and the monitor drive circuit 43 as the display part, and the computation part 31 for controlling the live view display.

Figure 4:
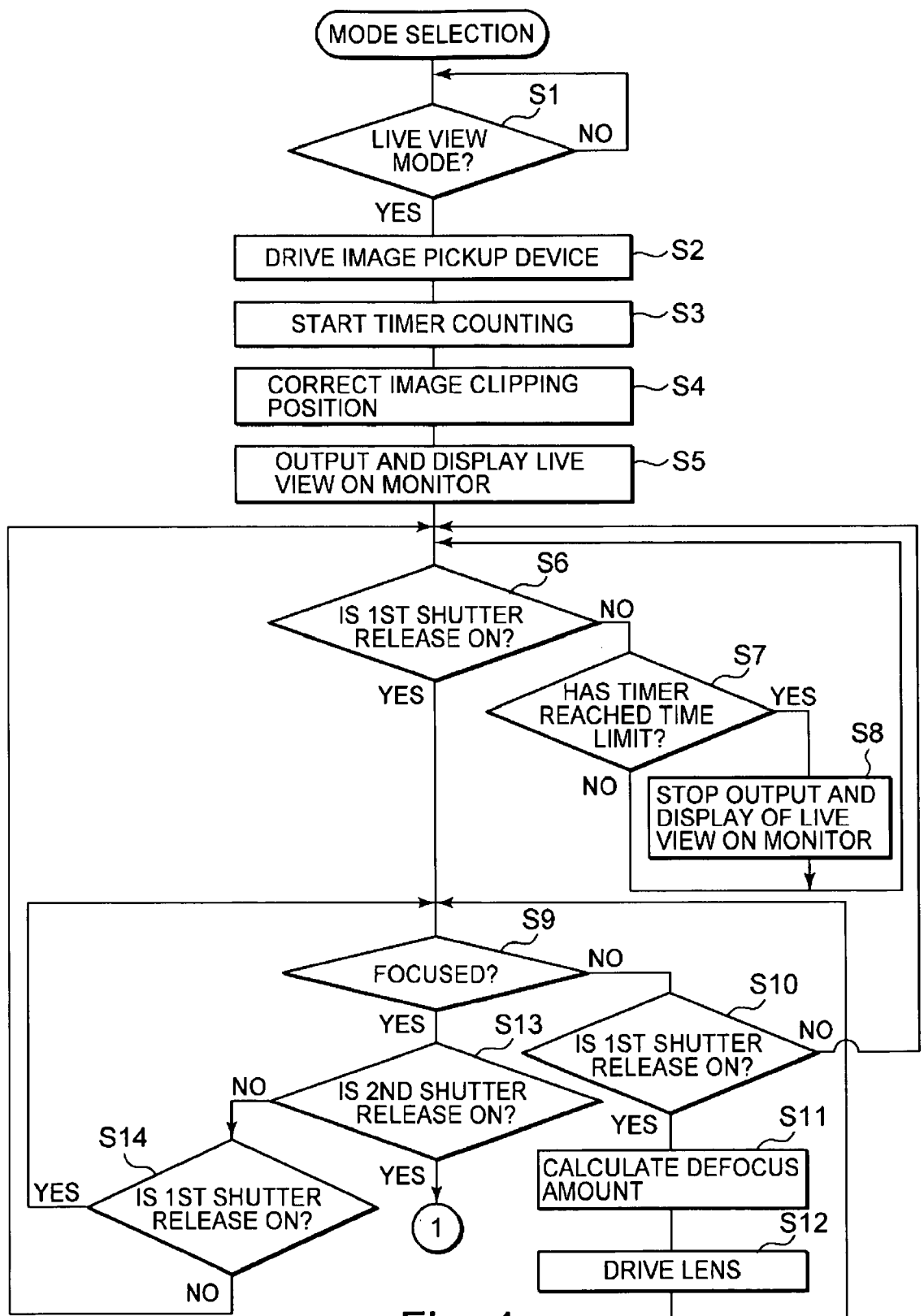
FIG. 4 shows the first half of a flowchart of the shooting operation of the digital single-lens reflex camera according to the embodiment of the present invention including processing for live view display.
Figure 5:
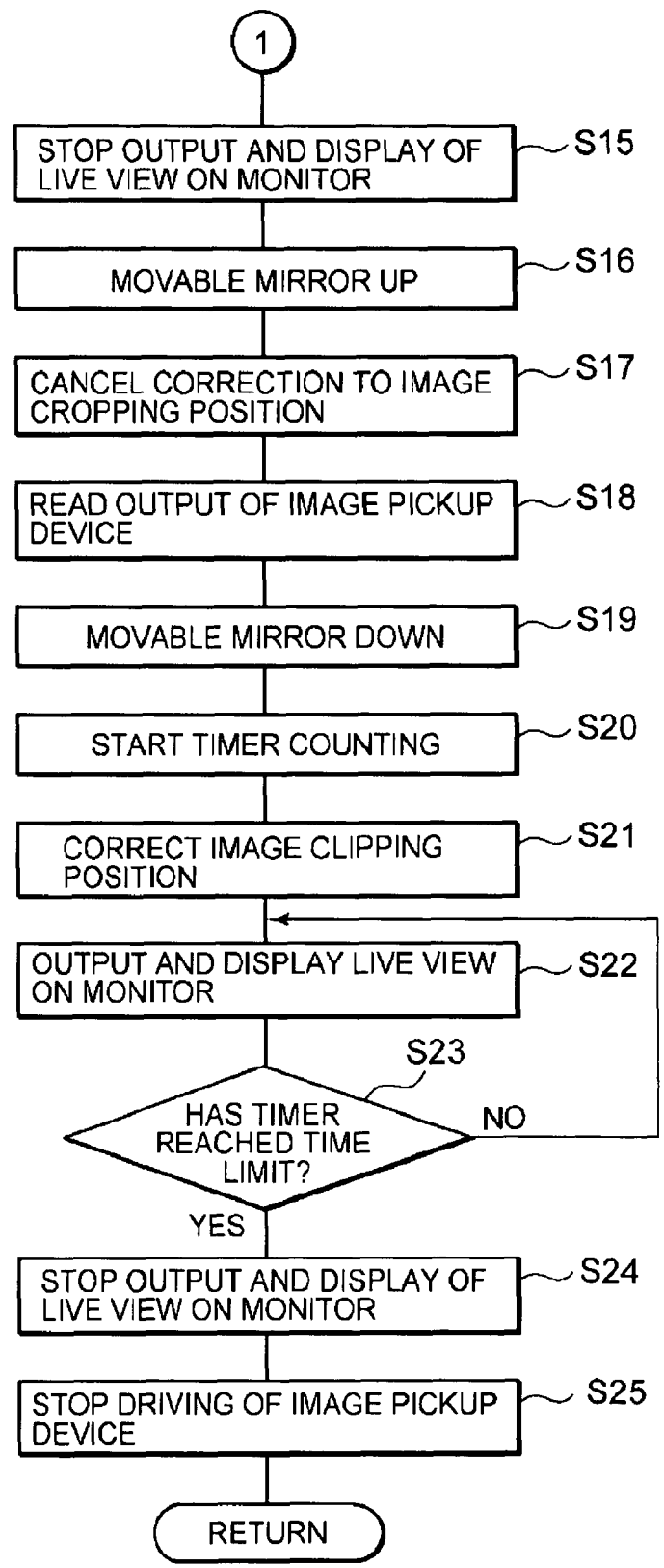
FIG. 5 shows the last half of the flowchart of the shooting operation of the digital single-lens reflex camera according to the embodiment of the present invention including processing for live view display.

The following describes the operation of the digital single-lens reflex camera having the structure mentioned above. FIGS. 4 and 5 show a flowchart of the shooting operation of the camera including processing for live view display. The processing of the flowchart is controlled by the computation part 41.

The computation part 41 first determines whether the live view mode is set (step S1). If the live view mode is not set, the computation part 41 waits until the live view mode is set. In fact, however, the computation part 41 executes the processing of a main flowchart, not shown, during this waiting time. On the other hand, if it is determined in step S1 that the live view mode is set, the procedure branches from step S1 to step S2. The computation part 41 sends an instruction to the motor drive circuit 45 to open the shutter 23, and then drives the image pickup device 25 through the image pickup device driving circuit 42 to capture a series of images for live view display based on the above-mentioned second light beam (step S2). At this point, the movable mirror 12 is at the down position. Next, the computation part 41 instructs an internal timer, not shown, to start counting (step S3). This timer counts a period of time, and after this period the live view display is stopped unless the photographer performs some operation.

Next, the computation part 41 corrects (changes) the clipping position for the series of images acquired by the image pickup device 25 (step S4). The details of the correction to the clipping position will be described later.

After completion of correcting the clipping position for the series of images in step S4, the computation part 41 displays a live view clipped to fit into the corrected position on the monitor 27 through the monitor drive circuit 43 (step S5). Next, the computation part 41 determines whether the photographer turns on the 1st shutter release switch (step S6). If it is determined in step S6 that the 1st shutter release switch is not turned on, the procedure branches from step S6 to step S7 in which the computation part 41 determines whether the timer that started counting at step S2 has counted the predetermined, limited period of time (step S7). If it is determined in step S7 that the limited period of time has been counted, the procedure branches from step S7 to step S8. In step S8, the computation part 41 stops outputting the series of images from the image pickup device 25 through the image pickup device driving circuit 42 (step S8). After that, the procedure returns to step S6. On the other hand, if it is determined in step S7 that the limited period of time has not been counted yet, the procedure returns to step S6 without stopping the live view display.

Further, if it is determined in step S6 that the 1st shutter release switch is turned on, the procedure branches from step S6 to step S9, and the computation part 41 performs a calculation based on the output of the AF sensor 19 to see if the photographing optical system 2 is focused (step S9). If it is determined in step S9 that the photographing optical system 2 is not focused yet, the procedure branches from step S9 to step S10. In step S10, the computation part 41 determines whether the 1st shutter release switch remains on (step S10). If it is determined in step S10 that the 1st shutter release switch remains on, the procedure branches from step S10 to step S1. In step S1, the computation part 41 calculates a defocus amount in the photographing optical system 2 from the output of the AF sensor 19 using a technique such as correlation calculation (step S1). After calculating the defocus amount, the computation part 41 sends the calculated defocus amount to the computation part 31 inside the interchangeable lens 1. The computation part 31 calculates, from the sent defocus amount, the amount of driving required to focus the photographing optical system 2. Based on the amount of driving calculated, the computation part 31 controls the focus motor driving circuit 32 to adjust the focus of the photographing optical system 2 (step S12). After that, the procedure returns to step S9. On the other hand, if it is determined in step S10 that the 1st shutter release switch is turned off, the procedure returns to step S6.

Further, if it is determined in step S9 that the photographing optical system 2 is focused, the procedure branches from step S9 to step S13. In step S13, the computation part 41 determines whether the photographer turns on the 2nd shutter release switch (step S13). If it is determined in step S13 that the 2nd shutter release switch is not turned on, the procedure branches from step S13 to step S14. In step S14, the computation part 41 determines whether the 1st shutter release switch remains on (step S14). If it is determined in step S14 that the 1st shutter release switch remains on, the procedure returns to step S9. On the other hand, if it is determined in step S14 that 1st shutter release switch is turned off, the procedure returns to step S6.

Further, if it is determined in step S13 that the 2nd shutter release switch is turned on, the procedure branches from step S13 to step S15. In step S15, in order to record an image, the computation part 41 stops outputting the series of images for live view display from the image pickup device 25 through the image pickup device driving circuit 42 to stop the live view display on the monitor 27 (step S15). Next, the computation part 41 changes the position of the movable mirror 12 to the up position through the motor drive circuit 45 (step S16), and open and close the shutter 23 based on the exposure time calculated from the output of the AE sensor 47 to make an exposure. After that, the computation part 41 cancels the correction to the clipping position for the series of images from the image pickup device 25 (step S17). Then, the computation part 41 reads an image for recording from the image pickup device 25 through the image pickup device driving circuit 42 (step S18). Then, the computation part 41 performs known image processing on the read image, compresses the processed image using a technique such as JPEG compression, and records the compressed image on the recording medium 44 as a still image.

After recording the image, the computation part 41 changes the position of the movable mirror 12 to the down position through the motor drive circuit 45 (step S19). Then, the computation part 41 instructs the internal timer, not shown, to start counting (step S20), and corrects the clipping position for a present series of images acquired by the image pickup device 25 (step S21). After that, the computation part 41 displays a live view clipped to fit into the corrected position on the monitor 27 through the monitor drive circuit 43 (step S22). After displaying the live view again, the computation part 41 determines whether the timer that started counting at step S20 has counted the predetermined, limited period of time (step S23). If it is determined in step S23 that the limited period of time has not been counted yet, the procedure returns to step S22. On the other hand, if it is determined in step S23 that the limited period of time has been counted, the procedure branches from step S23 to step S24. In step S24, the computation part 41 stops outputting the series of images for live view display from the image pickup device 25 through the image pickup device driving circuit 42 to stop the live view display on the monitor 27 (step S24). The computation part 41 further stops the driving of the image pickup device 25 (step S25), and exits from the flowchart shown in FIGS. 4 and 5 to execute the processing of the main flowchart, not shown.

The following describes the details of the correction to the clipping position for the series of images in step S4 of FIG. 4 and step S21 of FIG. 5. As stated above, since the movable mirror 12 is at the down position during the live view display, when passing through the movable mirror 12, the light beam is refracted as indicated by reference numeral 62 in FIG. 6 rather than going straight as indicated by reference numeral 61 in FIG. 6. For this reason, a displacement of d in FIG. 6 exists between the angle of view of the image obtained when the movable mirror 12 is at the down position and the angle of view of the image obtained when the movable mirror 12 is at the up position. This results in a displacement of d between the angle of view of the image displayed in the live view and the angle of view of the image obtained at the time of actual image recording. The displacement of d can be eliminated by correcting the clipping position of the image, or changing the start position for reading pixel signals from the image pickup device, so that the angle of view of the image displayed in the live view will be made equal to the angle of view of the image obtained at the time of actual image recording.

Figure 6:
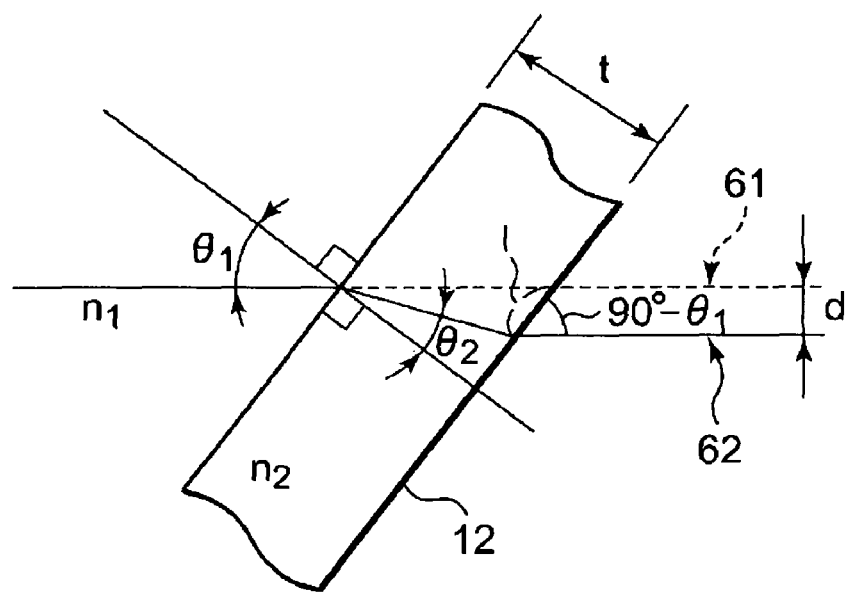
FIG. 6 is an illustration for explaining a displacement between the light beam of a subject image when the movable mirror is at the up position and the light beam of the subject image when the movable mirror is at the down position.

Here, if the light beam for forming a subject image is incident on the movable mirror 12 at an angle of $\theta_1$ as shown in FIG. 6, the angle of refraction $\theta_2$ can be determined according to the Snell's law:

$$n_1 \sin \theta_1 = n_2 \sin \theta_2 \qquad \text{(Eq. 1)}$$

where $n_1$ is the refractive index of air and $n_2$ is the refractive index of the movable mirror 12. Further, the length 1 can be determined by the following equation:

$$l = t(\tan \theta_1 - \tan \theta_2) \qquad \text{(Eq. 2)}$$

where t is the thickness of the movable mirror 12. In addition, since d in FIG. 6 shows the following relation:

$$d = l \sin(90° - \theta_1) \quad \text{(Eq. 3)}$$

d can be determined from (Eq. 1) to (Eq. 3).

Figure 7:
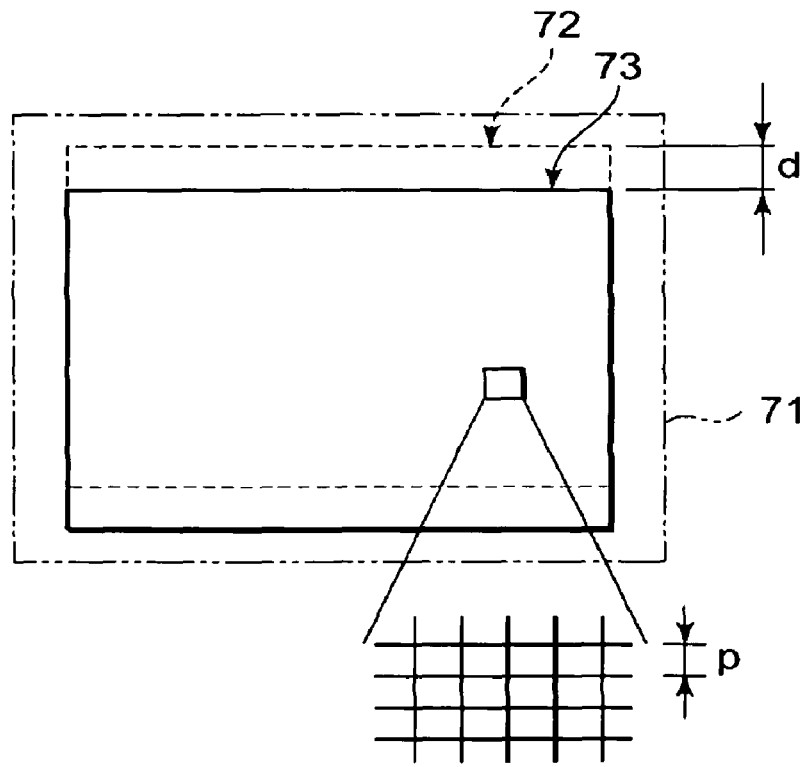
FIG. 7 is an illustration for explaining how to correct the image clipping position.

As shown in FIG. 7, in order to correct for the value d thus determined, the effective area 71 of the image pickup device 25 is set wider than the areas used for display and actual recording to allow for upward shifting of an image 73 obtained when the movable mirror 12 is at the down position by an amount corresponding to the displacement of d so that the angle of view of the image 73 will match the angle of view of an image 72 obtained when the movable mirror 12 is at the up position. The shift amount is given by: Shift Amount=d/p (pixel), where p is a pitch equivalent to one pixel. This correction makes it possible to match the angle of view of the image displayed in the live view with the angle of view of the image to be actually recorded.

Here, since the refractive indexes $n_1$ and $n_2$, the angle $\theta_1$, and the thickness t of the movable mirror 12 can be decided in the design process, the displacement of d can also be determined upon designing of the camera. In this case, the amount of pixel shift for correcting the clipping position of the image takes on fixed values decided upon designing of the camera.

As described above, according to the embodiment, phase-contrast AF can be performed simultaneously while performing live view display. In the embodiment, since the live view display is performed on condition that the movable mirror 12 is at the down position, the light beam passing through the movable mirror 12 is refracted to make a difference between the angle of view of the image for the live view display and the angle of view of the image for recording. However, according to the embodiment, the clipping position for live-view images can be corrected to match the angle of view of the image for live view display with the angle of view of the image for recording. Instead of correcting the clipping position for live-view images, the image position can be shifted at the time of live view display to obtain the same effect.

While there has been shown and described what is considered to be a preferred embodiment of the invention, it will, of course, be understood that various modifications and changes in form or detail could readily be made without departing from the spirit of the invention.

Further, the above embodiment includes various stages of inventions so that the various inventions can be extracted from combinations of a plurality of disclosed structural elements. For example, even when some elements are omitted from all the required structural elements of the embodiment, the arrangement from which these structural elements are omitted can be extracted as an invention as long as the problem described in "BACKGROUND OF THE INVENTION" can be solved and the effect described in "BRIEF SUMMARY OF THE INVENTION" can be obtained.

It is therefore intended that the invention not be limited to the exact form described and illustrated, but constructed to cover all modifications that may fall within the scope of the appended claims.

What is claimed is:

1. A digital single-lens reflex camera comprising:
   a first mirror for reflecting part of a light beam coming from a subject through a photographing optical system as a first light beam, and transmitting the remaining light beam as a second light beam;
   a relay lens on which the first light beam is incident;
   a second mirror for reflecting part of the light beam passing through the relay lens as a third light beam, and transmitting the remaining light beam as a fourth light beam;
   a screen on which a subject image based on the third light beam is formed again;
   a loupe optical system for observing the subject image on the screen;
   an AF optical system on which the fourth light beam is incident;
   a focus-state detection part for detecting the focus state of the photographing optical system based on the fourth light beam passing through the AF optical system;
   an imaging part including an image pickup device repeatedly capturing images of the subject based on the second light beam; and
   a display part for performing live view display based on subject image signals output from the imaging part.

2. The camera according to claim 1, wherein the first mirror is capable of being retracted from the optical path of the photographing optical system, and the imaging part captures a still image on condition that the first mirror is retracted from the optical path of the photographing optical system.

3. The camera according to claim 2, wherein the clipping position of the subject image captured by the image pickup device is changed depending on whether the first mirror is located outside of the optical path.

4. The camera according to claim 2, wherein the imaging part changes the clipping position when live view display is performed.

5. A digital single-lens reflex camera comprising:
   a first mirror for reflecting part of a light beam coming from a subject through a photographing optical system, and transmitting the remaining light beam;
   a live view display section for performing live view display based on the light beam passing through the first mirror; and
   a finder section for enabling the observation of a subject image based on the light beam reflected by the first mirror, wherein the finder section includes:
   (a) a relay lens for relaying the light beam reflected by the first mirror;
   (b) a second mirror for reflecting part of the light beam passing through the relay lens and transmitting the remaining light beam;
   (c) a screen on which a subject image based on the light beam reflected by the second mirror is formed again;
   (d) an eyepiece optical system for observing the screen;
   (e) an AF optical system on which the light beam passing through the second mirror is incident; and
   (f) an AF sensor receiving the light beam passing through the AF optical system.

6. The camera according to claim 5, wherein the finder section includes a prism for guiding the light beam reflected by the first mirror to the relay lens.

7. The camera according to claim 5, wherein the finder section includes a reflection optical system consisting of a prism for guiding the light beam reflected by the first mirror to the relay lens, and a total reflection mirror.

8. The camera according to claim 5, wherein the finder section includes a total reflection mirror for guiding the light beam reflected by the second mirror to the screen.

* * * * *